United States Patent
Kohlstette et al.

(10) Patent No.: US 12,110,110 B2
(45) Date of Patent: Oct. 8, 2024

(54) AIRCRAFT BARRIER SYSTEM HAVING A DELAYING UNLOCKING MECHANISM, AND AIRCRAFT AREA AND AIRCRAFT HAVING SUCH AIRCRAFT BARRIER SYSTEM

(71) Applicants: Airbus Operations GmbH, Hamburg (DE); Airbus Americas, Inc., Herndon, VA (US)

(72) Inventors: Joerg Kohlstette, Hamburg (DE); Frank Cordes, Hamburg (DE); John Brewster, Herndon, VA (US)

(73) Assignees: Airbus Operations GmbH, Hamburg (DE); Airbus Americas, Inc., Herndon, VA (US)

( * ) Notice: Subject to any disclaimer, the term of this patent is extended or adjusted under 35 U.S.C. 154(b) by 677 days.

(21) Appl. No.: 16/709,082

(22) Filed: Dec. 10, 2019

(65) Prior Publication Data

US 2020/0198785 A1    Jun. 25, 2020

Related U.S. Application Data

(60) Provisional application No. 62/783,246, filed on Dec. 21, 2018.

(51) Int. Cl.
*B64D 11/00* (2006.01)
*E05B 17/20* (2006.01)
(Continued)

(52) U.S. Cl.
CPC ...... *B64D 11/0023* (2013.01); *E05B 17/2007* (2013.01); *E05B 41/00* (2013.01);
(Continued)

(58) Field of Classification Search
CPC ............ B64C 1/1469; Y10T 292/0911; Y10T 292/0945; Y10T 292/0926;
(Continued)

(56) References Cited

U.S. PATENT DOCUMENTS

| 5,035,450 A | * | 7/1991 | Muller | ................ E05B 47/0046 292/341.16 |
| 2005/0189773 A1 | * | 9/2005 | Tsai | .................... E05B 17/0025 292/241 |

(Continued)

FOREIGN PATENT DOCUMENTS

| EP | 0022439 A2 | 7/1979 |
| WO | 03029591 A2 | 4/2003 |

(Continued)

*Primary Examiner* — Christine M Mills
*Assistant Examiner* — Yahya Sidky
(74) *Attorney, Agent, or Firm* — Greer, Burns & Crain, Ltd.

(57) ABSTRACT

An aircraft barrier system separating, within an aircraft, a secure area from a passenger cabin of the aircraft, comprises a barrier installed inside the passenger cabin and configured to move between an open position and a closed position, a latch mounted to the barrier, and a locking device comprising a latching clamp configured to lock the latch when the barrier is in the closed position. The aircraft barrier system further comprises a release mechanism configured to move the latching clamp from a locking state locking the latch to an unlocking state releasing the latch, wherein the release mechanism is further configured to delay the moving of the latching clamp from the locking state to the unlocking state. Also, an aircraft area and an aircraft having such aircraft barrier system.

20 Claims, 9 Drawing Sheets

(51) Int. Cl.
*E05B 41/00* (2006.01)
*E05B 77/42* (2014.01)
*E05B 85/24* (2014.01)
*E05C 19/02* (2006.01)
*E05C 19/12* (2006.01)

(52) U.S. Cl.
CPC .............. *E05B 77/42* (2013.01); *E05B 85/24* (2013.01); *E05C 19/026* (2013.01); *E05C 19/12* (2013.01); *E05Y 2900/502* (2013.01)

(58) Field of Classification Search
CPC ......... Y10T 292/0928; Y10T 292/0931; Y10T 292/0932; Y10T 292/0934; Y10T 292/0948; Y10T 292/1043; Y10T 292/1051; Y10T 292/1052; Y10T 292/1057; Y10T 292/1061; Y10T 292/1078; Y10T 292/696; Y10T 292/702; E05B 17/0041; E05B 77/42; E05C 3/045; E05C 3/00; E05C 3/004; E05C 3/12; E05C 19/10
See application file for complete search history.

(56) References Cited

U.S. PATENT DOCUMENTS

| | | | |
|---|---|---|---|
| 2006/0000946 A1* | 1/2006 | Garofani | B64D 11/00 52/64 |
| 2008/0054123 A1* | 3/2008 | French | B64C 1/1469 292/205 |
| 2018/0209185 A1* | 7/2018 | Long | E05B 53/00 |
| 2018/0265216 A1* | 9/2018 | Breigenzer | E05B 81/70 |
| 2018/0346091 A1* | 12/2018 | Movsesian | B64D 45/0028 |

FOREIGN PATENT DOCUMENTS

| | | |
|---|---|---|
| WO | 2011055097 A2 | 5/2011 |
| WO | 2016160662 A1 | 10/2016 |

* cited by examiner

AIRCRAFT BARRIER SYSTEM HAVING A DELAYING UNLOCKING MECHANISM, AND AIRCRAFT AREA AND AIRCRAFT HAVING SUCH AIRCRAFT BARRIER SYSTEM

CROSS-REFERENCES TO RELATED APPLICATIONS

This application claims priority from U.S. Provisional Patent Application Ser. No. 62/783,246 filed Dec. 21, 2018, the entirety of which is incorporated herein by reference.

FIELD OF THE INVENTION

The invention relates to an aircraft barrier system, and an aircraft area as well as aircraft having such aircraft barrier system. In particular, the invention relates to an aircraft barrier system with a locking device having a release mechanism capable of delaying a movement of a latching clamp from a locking state to an unlocking state.

BACKGROUND OF THE INVENTION

In recent years developments have been made to protect a secure area within an aircraft, such as a cockpit, from potential intruders and attackers, e.g. by improving a cockpit door. However, while a cockpit door provides a secure barrier between a cockpit and passenger cabin of the aircraft, the cockpit door needs to be opened once in a while even during flight, for example if a pilot requires to leave the cockpit (to go to a lavatory or galley) or if a flight attendant needs to enter the cockpit (e.g. to bring food to a pilot).

For such or similar situations, where the cockpit door is open for a short period of time, a second barrier is required, which hinders a possible attacker from entering the cockpit. Such a second barrier may not need to provide the same strength as the cockpit door, since it has to withstand a possible attacker only for the short period of time. On the other hand, a second barrier can only be provided within the passenger cabin, which decreases the space available for seating and other passenger purposes. In this regard WO 2011/055097 A2 suggests a compact front section of an aircraft fuselage having a separation means including at least one mobile element suitable for being slid between an extended closing position in which said separation means defines, together with a door of a cockpit, a transition area between the cockpit and the passenger cabin, preventing persons from crossing between the passenger cabin and said transition area, and a retracted open position in which said separation means allows persons to cross between the passenger cabin and said transition area.

However, such slidable separation means is bulky and may be cumbersome to open for the pilot or flight attendant.

It is therefore an object of the invention to provide an aircraft barrier system, aircraft area and aircraft having such barrier system that is lightweight and delays possible attackers from entering a secured transition area.

SUMMARY OF THE INVENTION

This object may be achieved by an aircraft barrier system with the features of one or more embodiments described herein, an aircraft area with the features of one or more embodiments described herein, and an aircraft with the features of one or more embodiments described herein.

An aircraft barrier system for separating, within an aircraft, a secure area from a passenger cabin of the aircraft, comprises a barrier installed inside the passenger cabin and configured to move between an open position and a closed position, a latch mounted to the barrier, and a locking device comprising a latching clamp configured to lock the latch when the barrier is in the closed position. Such aircraft barrier system further comprises a release mechanism configured to move the latching clamp from a locking state locking the latch to an unlocking state releasing the latch, wherein the release mechanism is further configured to delay the moving of the latching clamp from the locking state to the unlocking state.

Thus, the aircraft barrier system may function similar to a usual locking device, but delays the locking device to actually open, i.e. move into an unlocking state. The delaying of the moving of the latching clamp may, for example, take between 1 and 60 seconds. As some regulations require a minimum delay of 5 seconds, the moving of the latching clamp is preferably delayed between 5 and 25 seconds and most preferably approximately 5 to 10 seconds. The delaying (delay time) may be pre-set or predefined or adjustable. Therefore, in case the barrier is opened by a person not allowed to enter the secure area, the barrier system provides sufficient time to close the cockpit door. In addition, it also provides sufficient time for anyone who is in the secure area to leave the secure area. According to a variant the release mechanism comprises an activator that triggers the delayed moving of the latching clamp from the locking state to the unlocking state. An activator may include a handlebar, a pin, a button, or any similar lever allowing the activator to be used, for example, to be moved, to trigger the delayed moving of the latching clamp. Therefore, the aircraft barrier system can be built similar to a normal door, but instead of immediately opening the door by an activator, the locking mechanism will open after a particular delay time.

According to a further variant, the activator includes a locking section configured to lock the latching clamp in the locking state. For instance, the activator can be configured to move from a closed position to an open position, wherein the locking section in the closed position of the activator blocks the latching clamp from moving. In other words, the activator has to be moved, so that its locking section clears or unblocks a space to which the latching clamp moves when moving from the locking state to the unlocking state.

Additionally or alternatively, the activator can be operated from a first side of the barrier facing the secure area and can be operated from a second side of the barrier facing the passenger cabin. For instance, the handlebar, pin, button or similar lever may be arranged, so that it sticks out from the first and second side of the barrier and can be grabbed and moved by a person standing on the first side and second side of the barrier, respectively.

In an optional implementation, the activator can be configured to move, when the latching clamp moves from the unlocking state to the locking state, together with the latching clamp. For instance, the activator can be able to move in a space cleared by the latching clamp, for example, due to gravity or a spring-loaded element pushing/pulling the locking section of the activator into the closed position, where it blocks the latching clamp.

In a variant, the locking section is implemented as a stiff (bar-type) element, which allows transmission of compressive forces as well as tensile forces. Alternatively, the locking section is implemented as a rope or wire, which allows transmission of tensile forces only.

Additionally or alternatively, the activator may be moved by a person operating the barrier. For instance, the activator may comprise a handle or may be reached with a finger of the person to be brought into a state, wherein the activator blocks the movement of the latching clamp. For instance, the activator may be connected to the latching clamp via a bar-type element, while the activator is rotatably mounted in the locking device. The bar-type element may have a length that does not allow the activator to rotate by gravity to a position corresponding to the latching clamp being in the locking state. Nevertheless, the person closing the barrier may further rotate the activator to an over center position, i.e. beyond a dead center of the activator and bar-type element. For instance, when moving beyond the dead center position, the bar-type element moves over the point of rotation (joint) of the activator. In this position the activator blocks the movement of the latching clamp via the bar-type element and the activator needs to be moved over the dead center again (where the bar-type element can move freely).

In a further variant the release mechanism comprises a spring element acting on the latching clamp to move the latching clamp from the locking state to the unlocking state, and a damper connected to the latching clamp and delaying the movement of the latching clamp. Thus, the actual locking of the latch takes place by keeping the latching clamp in the locking state, for example, with the activator. Once the activator is moved out of the way, the latching clamp can be moved by the spring element towards the unlocking state. This movement of the latching clamp is, however, delayed due to the damper. Therefore, the damper counteracts on the force of the spring element directly or indirectly (e.g. via the latching clamp). For instance, the spring element may be arranged within or around the damper, so that damper and spring element form a constructional unit.

According to a variant, the damper may be implemented in form of a cylinder and piston, in which a fluid, such as oil, has to flow through a small aperture or valve, if the piston is to be moved. By controlling the rate of flow of the fluid, e.g. opening or closing the valve to a certain degree, the damping effect and, hence, delay time for the latching clamp to achieve the unlocking state can be set.

Additionally or alternatively, the damping and, hence, delaying can be achieved by a motor moving the latching clamp. For example, the motor may be coupled to the latching clamp in a manner that a rotation of the motor in one direction moves the latching clamp from the locking state to the unlocking state and a rotation of the motor in the opposite direction moves the latching clamp from the unlocking state to the locking state. By setting the speed of the motor, the delay time of the latching clamp to reach the unlocking state can be set.

In another variant, alternatively or additionally, the aircraft barrier system may further comprise a visual indicator connected to the locking device and configured to visually indicate whether the latching clamp is in the locking state or the unlocking state. This allows anyone in the secure area, the passenger cabin and/or the cockpit (e.g. through a door viewer) to check whether the locking device is still locking the barrier, and whether the barrier is open or whether the barrier will be open soon, i.e. that the delayed movement of the latching clamp has already started.

Furthermore, in an optional variant the visual indicator is connected to the latching clamp and moves together with the latching clamp from the locking state to the unlocking state of the latching clamp. This movement of the visual indicator further allows a visual indication on the state of the latching clamp, i.e. whether it is still in the locking state, whether it is in the delayed movement towards the unlocking state or whether it is already in the unlocking state.

Additionally or alternatively, the visual indicator can be connected to the activator and moves together with the activator from the closed position to the open position of the activator. This allows anyone looking at the visual indicator to immediately see whether the activator has been moved, i.e. that the activator already triggered the delayed movement of the latching clamp. In this regard, it is helpful, if the latching clamp contacts the activator during moving from the locking state to the unlocking state, so that the visual indicator also continuously moves and continuously indicates the position of the latching clamp.

According to a further variant, the latching clamp has a hook shaped end and is configured to hook into a lock section of the latch. The latching clamp, for example, may have an L-shape or J-shape or a U-shaped end interacting with a corresponding lock section of the latch.

The lock section of the latch may, for example, have a similar shape as the latching clamp. For example, the lock section of the latch can have a hook-shape, such as an L-shape or J-shape or a U-shaped end. In this case the latch may be mounted in a manner opposite to that of the latching clamp, so that the respective ends of the latch and latching clamp can interlock with one another.

The lock section of the latch, on the other hand, may have the form of a bar with an axial direction approximately perpendicular to a plane in which the latching clamp lies. Thus, the latching clamp may engage over or behind the lock section of the latch when the latching clamp enters the locking state. In this case, the latch may have a fork-shaped form, at an end of which (facing the locking device) the bar type lock section is arranged.

According to another variant, the latching clamp comprises two C-shaped levers pivotally connected to one another at a first end of each lever and configured to be moved relative to one another. For example, a joint may be provided at the first end of each lever connecting both levers to one another and allowing a rotational movement of both levers with respect to one another. Therefore, a second end of the levers can be brought into a position spaced apart from one another when the latching clamp is in the unlocking state and the second ends of the levers are contacting each other or are overlapping each other when the latching clamp is in the locking state. The levers can be arranged in parallel planes, so that the second ends of the levers are arranged next to one another, so that they can be brought into an overlapping position.

In addition, the levers may be dimensioned, so that they enclose or encircle a space in which the lock section of the latch can be placed, so that the latch is locked when the levers of the latching clamp are contacting or overlapping each other at their respective second ends.

In an optional variant the latching clamp is configured to be moved by the latch when the barrier is moved from the open position to the closed position. For instance, the lock section of the latch or a different portion of the latch may contact the levers, for example, close to the respective first end of the levers, thereby moving (pushing) the levers and their joint together with the barrier when being closed (in the closing direction of the barrier). Alternatively or additionally, the latch or barrier may contact the levers near their second ends, so that the levers are moved (pushed) together with the barrier when brought into the closed position.

This latch induced movement of the levers or, alternatively or additionally, a manual movement of the levers by the person closing the barrier may simultaneously close the levers. For instance, the locking device can comprise two guides each contacting one of the levers. The guides are arranged, so that the levers rotate around their joint when being moved together with the latch and/or barrier. For instance, each guide may be arranged in the same plane as a respective lever and may have a slant surface, wherein the slanted surfaces of both guides taper towards each other, so that each lever contacts the respective guide's slant surface at an outer portion of the lever. Thus, the second end of the levers are moving towards each other when the latching clamp is moved by the latch when the barrier is moved from the open position to the closed position.

Additionally or alternatively, each lever may be provided with a pin extending on at least one side of the lever approximately perpendicular to the main plane of the lever, e.g. perpendicular to a moving direction of the barrier and moving direction of the latching clamp. The pin contacts the respective guide, and in particular a slant surface of the respective guide. For instance, each guide may have the form of a rectangle, wherein the pin is arranged inside the inner space of the rectangle. When the rectangle is arranged at an angle between 0° and 90°, preferably between 30° and 60°, to the closing direction of the latch and barrier, the guides and pins force the levers to close, i.e. to move the second ends of both levers towards each other when the barrier is closed.

According to a variant, the barrier is slidable in a horizontal direction or a vertical direction to be moved between the open position and the closed position. For instance, the barrier may be configured as a (rolling) shutter, e.g. that can be rolled and unrolled horizontally or vertically, respectively. Alternatively, the barrier can be pleated when brought into the open position. A shutter may require more space in an open position compared to a pleated material barrier, but may provide additional strength to the barrier system. The locking device is provided at a side of the barrier (horizontal closing) or a bottom of the barrier (vertical closing). In case of a vertically closing barrier (e.g., a shutter) one or two locking devices can be provided on one side or both sides of the barrier at or near a bottom, i.e. near the floor of the passenger cabin. Alternatively, one locking device can be installed in the floor.

Furthermore, a slidable barrier can be guided in corresponding rails at one or both sides thereof. In addition, the barrier may comprise a spring-loaded retracting device retracting the barrier automatically to the open position, if unlatched.

In a further variant, the aircraft barriers system may include a secondary opening means for the barrier and/or an override mechanism. Such secondary opening means may be independently arranged from the locking device, so that the barrier can be opened in case of a defect locking device. For example, a secondary opening means can be only accessible or reachable from the secure area, so that it allows anybody in the secure area to open the barrier, but cannot be opened from anybody outside of the secure area, e.g. from the passenger cabin. The secondary opening means may be implemented in the form of a slide or zip fastener in the material forming the barrier, or another means cutting or opening the barrier, or may be implemented as a releasing device for any hinges or mountings of the barrier or for releasing the entire barrier. Such releasing device can be provided on the side opposite the locking device. As an alternative, an override mechanism may be operated from a secure place accessible only from the secure area and/or the cockpit. The override mechanism may release and/or destroy the activator or the locking section, so that it does not block the latching clamp anymore. The latching clamp can then move from the locking state to the unlocking state in the described delayed manner.

In a further aspect, an aircraft area comprises a passenger cabin, a door to be secured, a secure area in front of the door, and an aircraft barrier system for separating the secure area from the passenger cabin. The aircraft barrier system may be an aircraft barrier system according to the first aspect or one of the described variants thereof.

In a variant, the aircraft area further comprises at least one monument, wherein a sidewall of the monument borders the secure area. Thus, the secure area has the form of an aisle extending in front of the cockpit door and along the sidewall of the at least one monument.

Additionally or alternatively, the locking device can be installed in such a way that the barrier, when in its closed position, may be approximately parallel to a sidewall of a monument bordering the secure area, e.g. the barrier provides an extension of the sidewall. In this case, the sidewall runs parallel or at an angle below 90° to a cockpit door (and hence the sidewall does not form a perpendicular aisle border in front of the cockpit door). Optionally, the secure area may be bordered by two monuments on opposite sides of the secure area. This allows mounting the barrier in or at a sidewall of a first monument and mounting the locking device in or on a sidewall of a second monument being arranged opposite of the first monument.

In a further additional or alternative variant the locking device is installed in a floor or ceiling of the passenger cabin. This allows providing the barrier at a ceiling or floor of the passenger cabin and moving the barrier vertically towards the floor or ceiling, respectively.

If monuments are arranged on both sides of the secure area, the barrier can close an opening provided between both monuments. Guide rails for the barrier can be attached to or integrated into the monuments to facilitate closing and opening the barrier and to enhance safety.

A monument may be a galley (or a portion thereof), a lavatory (or a portion thereof), and/or a partition (wall) (or a portion thereof) arranged inside the passenger cabin. For example, the monument or at least the portion thereof is arranged parallel to a bulkhead or other wall separating the cockpit from the passenger cabin.

According to a further aspect, an aircraft comprises an aircraft barrier system, according to the first aspect or one of its variants. Additionally or alternatively, the aircraft may comprise an aircraft area according to the second aspect or one of its variants.

The present disclosure is not restricted to the aspects and variants in the described form and order. It is to be understood that the present disclosure also covers combinations of the aspects and variants not explicitly described. Thus, each variant or optional feature can be combined with any other variant, optional feature, aspect or even combinations thereof.

BRIEF DESCRIPTION OF THE DRAWINGS

Preferred embodiments of the invention are now explained in greater detail with reference to the enclosed schematic drawings, in which FIG. 1 schematically illustrates a top view and a front view of and aircraft area comprising a secure area protected by a barrier system.

DETAILED DESCRIPTION OF THE PREFERRED EMBODIMENTS

Figure 1:
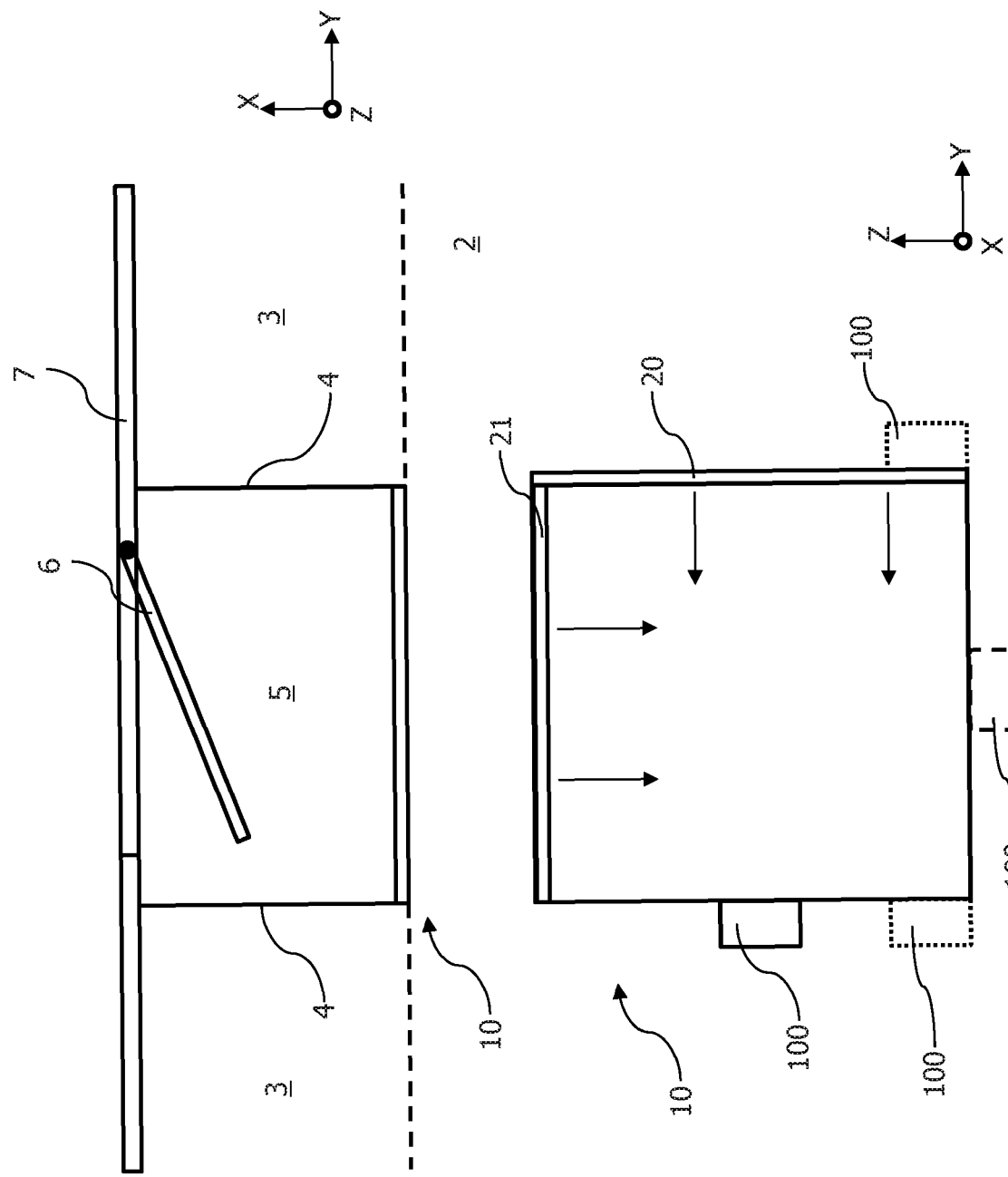

An aircraft area comprises a passenger cabin 2, a door 6 to be secured and mounted in a bulkhead 7 or other wall inside an aircraft 1 (FIG. 9), and a secure area 5 in front of the door 6. For example, door 6 may be a cockpit door, so that the secure area 5 in front of the cockpit door 6 requires additional protection, for example, during time periods when the cockpit door 6 is open.

The aircraft area may include one or more monuments 3 having at least one sidewall 4. Such sidewall(s) 4 may be arranged approximately perpendicular to the bulkhead 7, so that sidewall(s) 4 border an aisle-shaped secure area 5 in front of the door 6. While the illustrated monuments 3 have a rectangular footprint, it is to be understood that each monument can have any shape (footprint) or may even be only a partition (wall) that is arranged, for example, at the positions illustrated with dashed lines in FIG. 1.

In any case, the secure area 5 is protected by an aircraft barrier system 10. As can be derived from the front view of the aircraft barrier system 10 (bottom portion of FIG. 1), the barrier system 10 can comprise a horizontal-type barrier 20, which is opened and closed in a horizontal direction, or a vertical-type barrier 21, which is opened and closed in a vertical direction. Depending on the type of barrier 20, 21, a locking device 100 is installed opposite the barrier 20, 21 when in its respective opened position. For instance, for a horizontally closing barrier 20 a locking device 100 (depicted with solid lines in FIG. 1) can be installed in a sidewall 4 of a monument 3. In case of a vertically closing barrier 21, the locking device 100 (depicted with dotted lines in FIG. 1) can be installed at one or both sides of the barrier (e.g. in a sidewall 4 of the respective monument 3) near or directly above the floor. Alternatively, the locking device 100 (depicted with dashed lines in FIG. 1) can be installed in a floor of the passenger cabin 2, which requires adaptation of the cabin floor.

Figure 2:
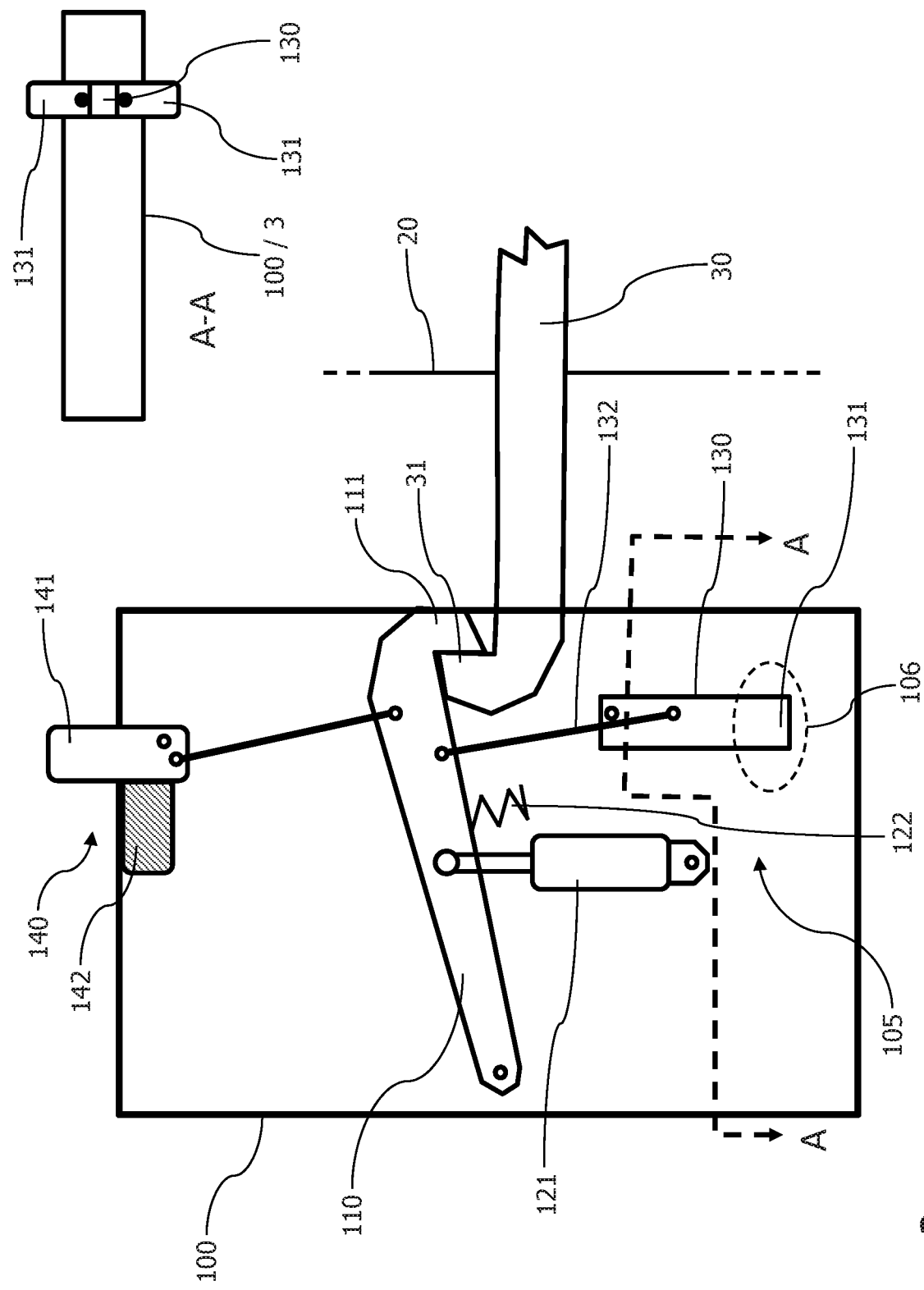
FIGS. 2 to 4 schematically illustrate a first variant of a locking device in different phases between a locking state and an unlocking state.
Figure 3:
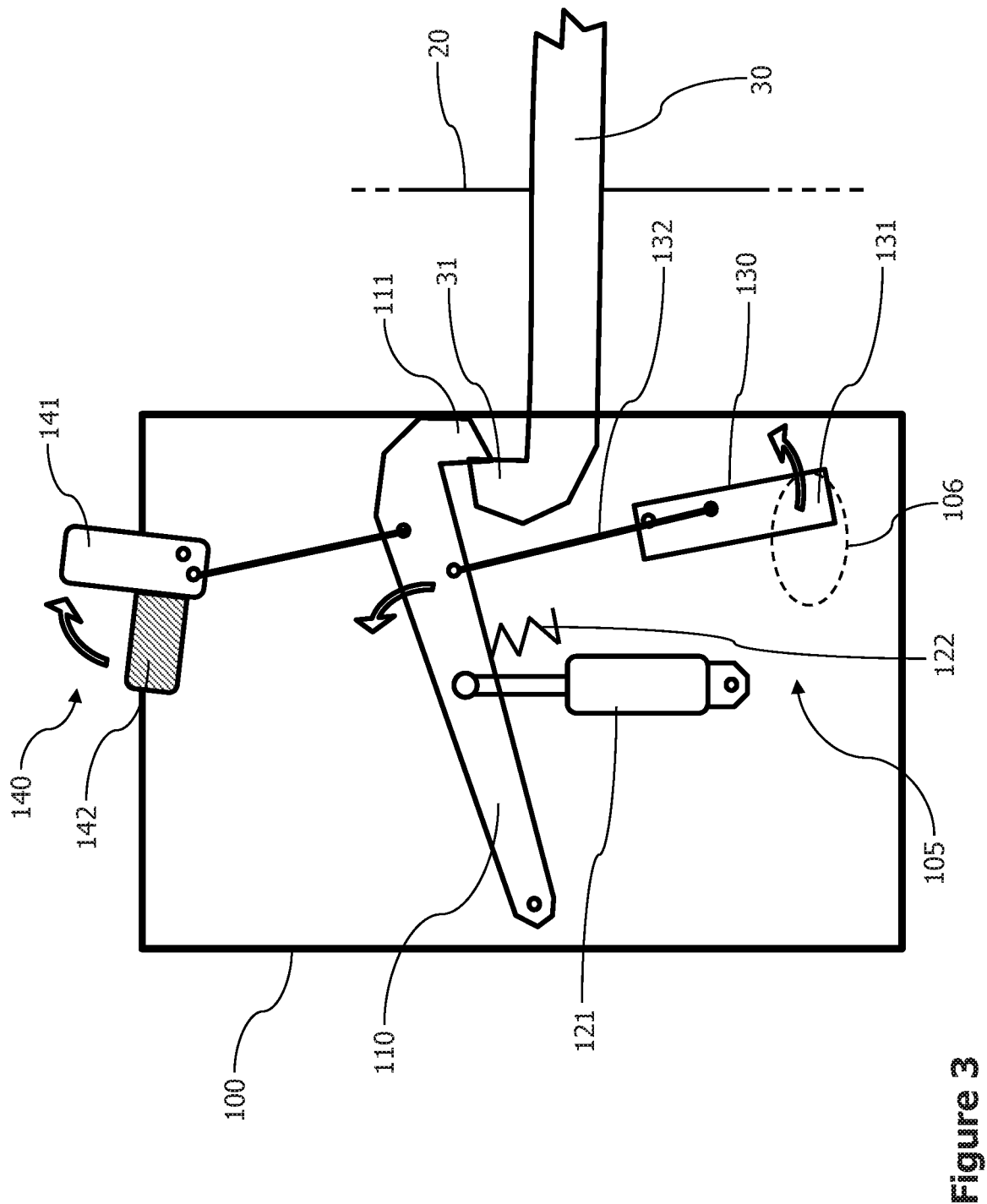
Figure 4:
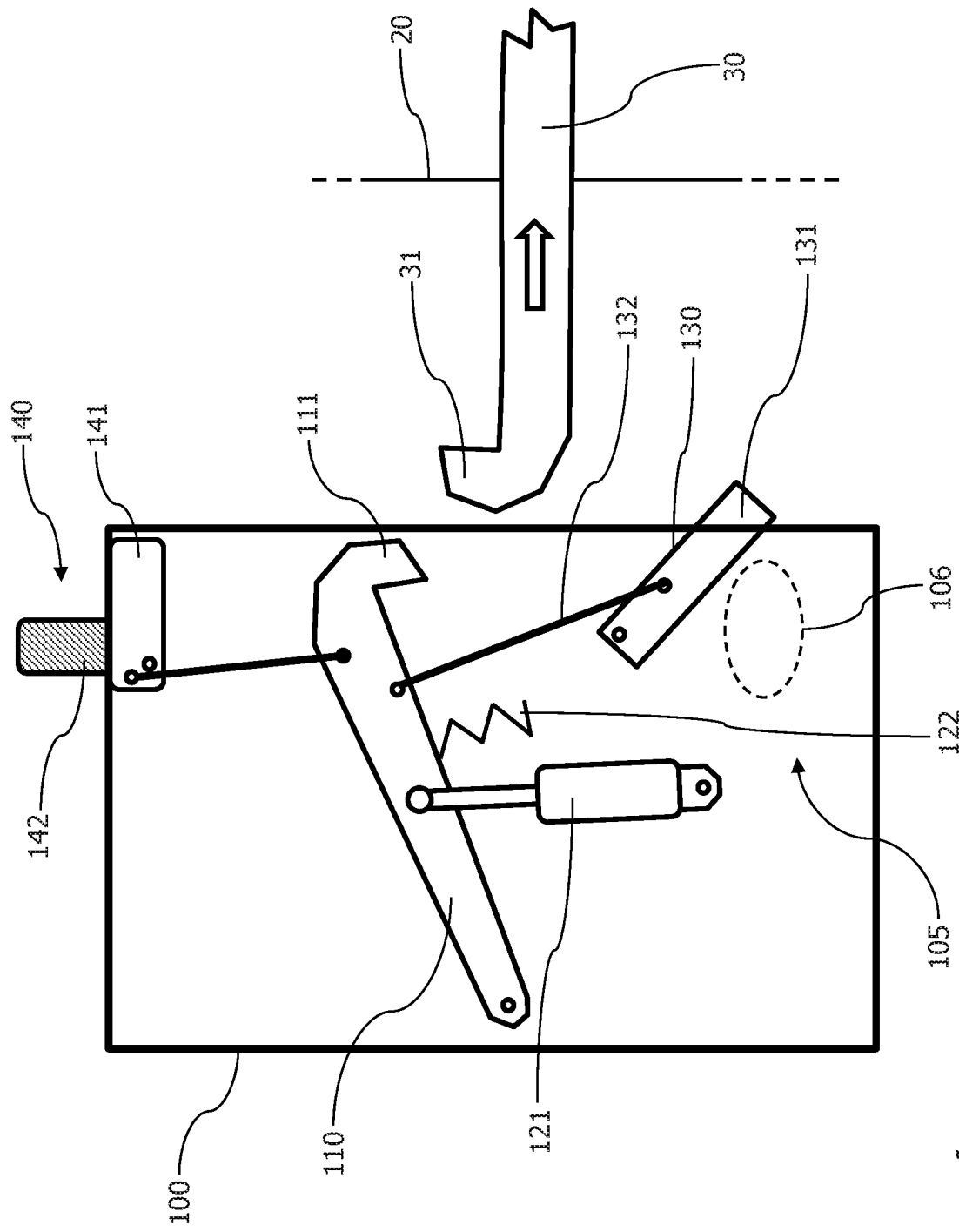

FIG. 2 schematically illustrates a first variant of a locking device 100 in a locking state. FIGS. 3 and 4 illustrate locking device 100 of FIG. 2 during unlocking and in an unlocking state, respectively. The locking device 100 interoperates with a latch 30 mounted to a barrier 20. The gap between barrier 20 and the locking device 100 in FIG. 2 is only for illustrative purposes. It is to be understood that barrier 20 can contact locking device 100, for example, at a right-hand side of locking device 100 in FIG. 2.

Locking device 100 comprises latching clamp 110 configured to lock the latch 30 when the barrier 20 is in the closed position. For example, the latching clamp 110 has a hook-shaped end 111 that is configured to hook into a lock section 31 of the latch 30. In the illustrated example of FIG. 2, latch 30 has a hook-shaped end 31, which is arranged in an opposite manner as hook-shaped end 111 of latching clamp 110, so that both ends 31, 111 engage and latch 30 is locked.

Furthermore, the barrier system 10 can further comprise a release mechanism 105 configured to move the latching clamp 110 from a locking state locking the latch 30 to an unlocking state releasing the latch 30. The release mechanism 105 is further configured to delay the movement of the latching clamp 110 from the locking state to the unlocking state. To achieve such delayed moving of the latching clamp 110, the release mechanism 105 comprises an activator 130 that triggers the delayed moving of the latching clamp 110 from the locking state to the unlocking state.

For instance, as illustrated in FIG. 2, the activator 130 includes a locking section 132 configured to lock the latching clamp 110 in the locking state. The locking section 132 is implemented in form of a bar-type element pivotally connected to latching clamp 110 and activator 130. The connecting point between activator 130 and locking section 132 is positioned on a side of a connecting point of the activator 130 and locking device 100, around which connecting point activator 130 pivots, opposite from the latching clamp 110. In the position illustrated in FIG. 2, the activator 130 is in a closed position, where the locking section 132 is in a dead center position. In other words, the locking section 132 blocks any movement of latching clamp 110, unless the locking section 132 is moved over the connecting point of the activator 130. When moved over the connecting point of the activator 130, the locking section 132 is free to move together with the activator 130, in particular the locking section 132 can freely follow a movement of the latching clamp 110.

The activator 130 comprises a touch section 131, which can be touched or hold by a user to pivot activator 130 over the dead center position, as it is illustrated in FIG. 3. The touch section 131 may simply be a side face of activator 130, which can be reached through an opening 106 in a housing of locking device 100. This is particularly suitable, in case activator 130 is completely housed inside locking device 100, and somehow hidden. Alternatively, as illustrated in cross-section A-A in FIG. 2, activator 130 may comprise a handlebar 131 which extends beyond a housing of locking device 100 or beyond a wall of a monument 3, so that a user can simply grab and/or hold handlebar 131 and move activator 130 over the dead center position.

In order to avoid that an aggressor pushes activator 130 or handlebar 131, thereby accelerating the movement of latching clamp 110 via locking section 132, locking section 132 can be implemented as a means not capable of transmitting compressive forces. For instance, locking section 132 can be implemented as a wire. Alternatively, locking section 132 may include a cylinder-piston arrangement, that allows a movement of activator 130 over the dead center, without transmitting any force onto latching clamp 110.

The release mechanism 105 may further comprise a spring element 122 acting on the latching clamp 110, in order to move the latching clamp 110 from the locking state to the unlocking state. Thus, after the activator 130 has been moved from the closed position (FIG. 2) to an open position (FIGS. 3 and 4), the locking section 130 does not block the latching clamp 110 from moving anymore. Then the latching clamp 110 can disengage from lock section 31 of latch 30 due to a movement (upwards in FIG. 2) induced by spring element 122. Latching clamp 110 may be pivotally hinged in locking device 100, for example at an end of latching clamp 110 opposite its hook-shaped end 111.

The release mechanism 105 further comprises a damper 121 connected to the latching clamp 110 and configured to delay the movement of the latching clamp 110. In other words, the damper 121 counteracts on the force provided by spring element 122. Damper 121 can be implemented in form of a cylinder and piston, wherein the piston is coupled to latching clamp 110. When latching clamp 110 moves, a fluid, such as oil, within the cylinder is pressed through an aperture, such as a valve, thereby slowing down the movement of the latching clamp 110. The spring element 122 can be installed next to damper 121 (as illustrated in FIG. 2), but can also be installed together with damper 121, for example around the piston of damper 121, in order to form a constructional unit.

When the latching clamp 110 has been moved far enough, the hook-shaped end 111 of latching clamp 110 disengages hook-shaped end 31 of latch 30, thereby achieving an unlocking state of the latching clamp 110. Latch 30 can now freely move, as illustrated in FIG. 4. If barrier 20 is provided with a retracting mechanism (for example, a spring-loaded retracting device) or the barrier 20 is made out of a flexible material, barrier 20 automatically moves to an open position. Alternatively, barrier 20 is manually moved to an open position after latch 30 is unlocked, i.e. latching clamp 110 has reached the unlocking state.

When closing the barrier 20, latch 30, and in particular the hook-shaped end 31 of latch 30, can be brought into a position, where latching clamp 110 can be brought into a locking state, where hook-shaped end 111 of latching clamp 110 engages hook-shaped end 31 of latch 30. In order to lock latch 30, activator 130 can be moved from the position illustrated in FIG. 4 towards the position illustrated in FIG. 2. Due to the movement of activator 130, locking section 132 moves latching clamp 110 towards its locking state. This may include moving the activator 130 beyond the dead center position, where locking section 132 blocks latching clamp 110 (cf. FIG. 2). In addition, when bringing the activator 130 into the closed position, spring element 122 is loaded (pushed together), in order to re-open latching clamp 110 and damper 121 is brought into a position, where its damping capability is activated.

The barrier system can further comprise a visual indicator 140. According to the first variant illustrated in FIGS. 2 to 4, visual indicator 140 is coupled to latching clamp 110 in a manner, that a movement of latching clamp 110 induces a movement of visual indicator 140. Visual indicator 140 is connected to the locking device 100 and configured to visually indicate whether the latching clamp 110 is in the locked state or the unlocked state. For instance, visual indicator 140 may comprise a first signaling section 141 and a second signaling section 142, which are arranged at an angle to one another, for example approximately perpendicularly to one another. The visual indicator 140 may be installed in the locking device 100 in such a manner, that first signaling section 141 is visible, for example is disposed outside of locking device 100 in an area visible from the outside of the barrier system 10, when the latching clamp 110 is in the locking state. Likewise, when the latching clamp 110 is in the unlocking state (see FIG. 4), the second signaling section 142 is visible, as visual indicator 140 has been moved (pivoted) around approximately 90°.

Figure 5:
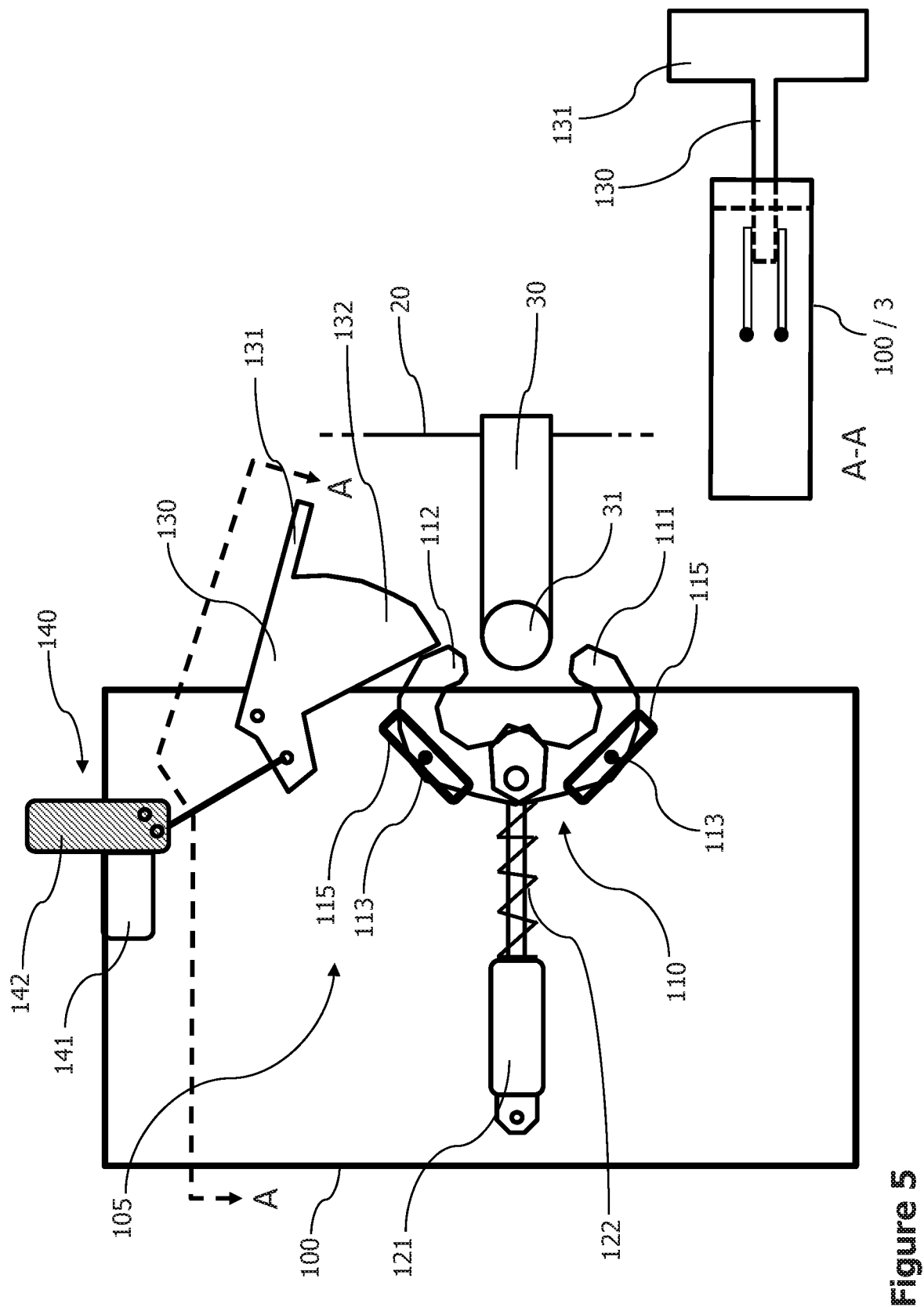
FIGS. 5 to 7 schematically illustrate a second variant of a locking device in different phases between an unlocking state and a locking state.
Figure 6:
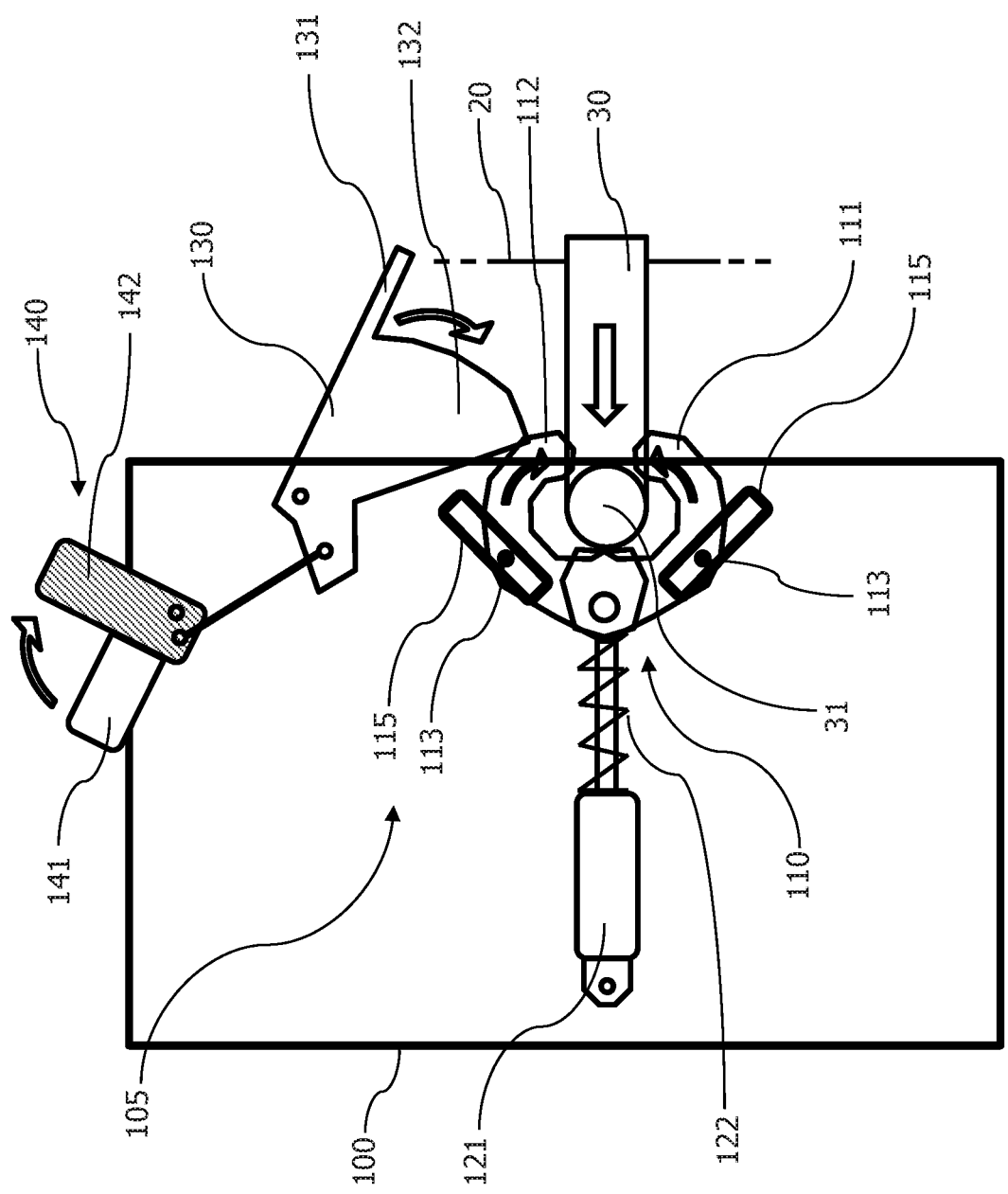
Figure 7:
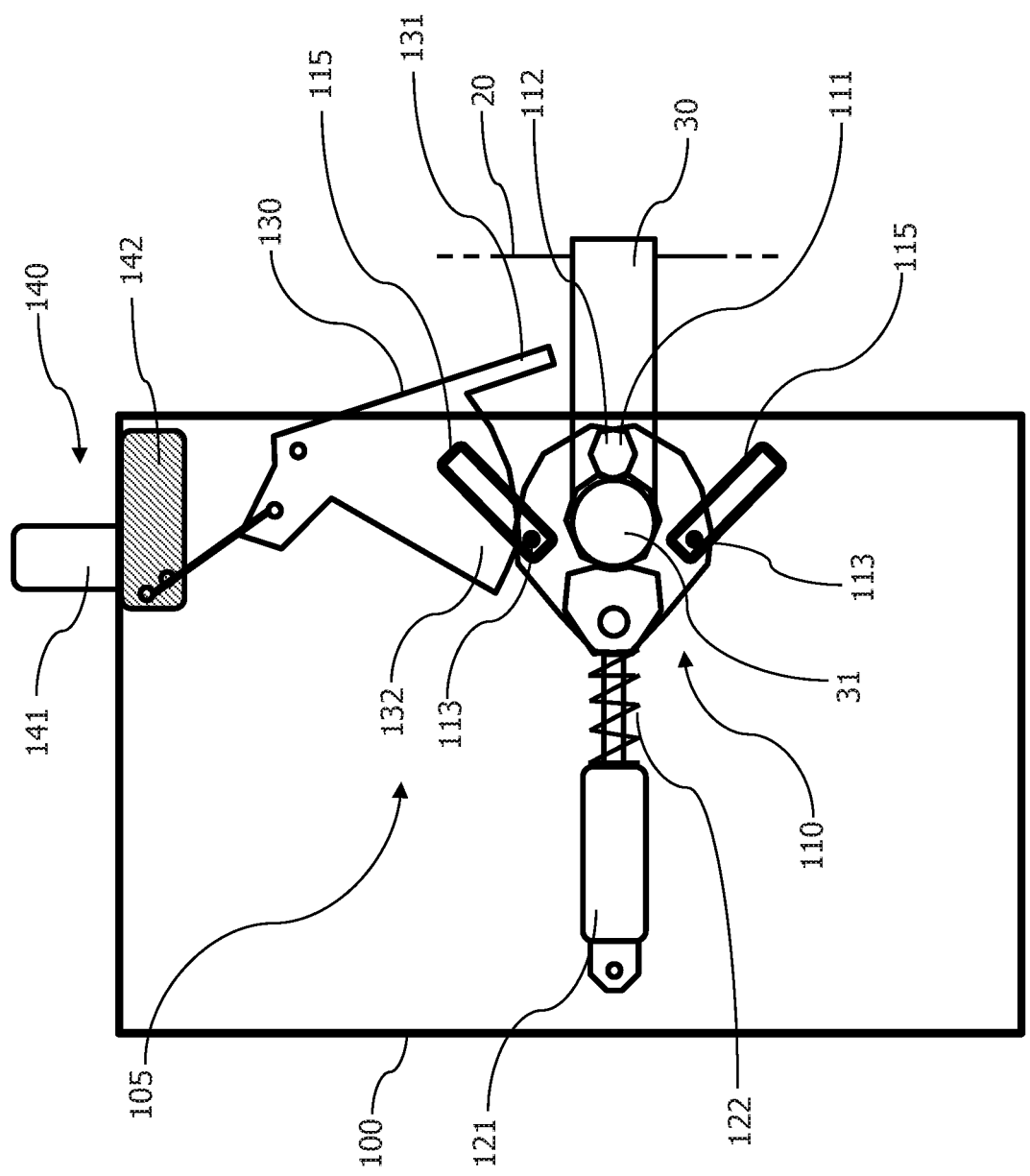

FIGS. 5 to 7 schematically illustrate a second variant of the locking device 100 during different phases between an unlocking state and a locking state. Like elements of the second variant that have the same functionality as like elements of the first variant are provided with the same reference signs. For the sake of brevity, only features that distinguish over the first variant are described with respect to the second variant of the locking device 100.

For instance, the lock section 31 of the latch 30 is implemented in form of a bar 31, which is arranged between a fork-shaped latch 30. This bar-type lock section 31 is used for a more secure locking of latch 30 in combination with a latching clamp 110 comprising two C-shaped levers 111, 112. Both levers 111, 112 are pivotally connected to one another at a first end of each lever 111, 112 and configured to be moved (rotated) relative to one another. A second end of each lever 111, 112 is spaced apart from one another when the latching clamp 110 is in the unlocking state, as illustrated in FIG. 5.

When closing barrier 20, latch 30, and in particular bar 31, contacts latching clamp 110 at or near the first end of the levers 111, as illustrated in FIG. 6. During this movement, latching clamp 110 is moved together with latch 30, i.e. to the left in FIGS. 5 and 6, until barrier 20 is in the closed position. At the same time, damper 121 and spring element 122 are pushed together. Thus, spring element 122 is loaded, in order to re-open latching clamp 110 and damper 121 is brought into a position, where its damping capability is activated.

The locking device 100 further comprises two guides 115 each contacting one of the levers 111, 112. In the illustrated variant, guides 115 each interact with a pin 113 provided at a side face of each lever 111. The guides 115 include a slant surface. For example, as depicted in FIGS. 5 to 7, guides 115 are implemented as rectangular components, inside of which the pin 113 of one of the levers 111, 112 is disposed. When moving to the left in FIGS. 5 to 7 due to the (pushing) movement of latch 30, the levers 111, 112 rotate with respect to one another around the joint provided at their first end. Simultaneously, the second ends 112 of levers 111, 112 are moving towards one another until the second ends either contact each other or are provided in an overlapping manner, when the latching clamp 110 is in the locking state (cf. FIG. 7). For instance, levers 111, 112 may fully surround bar 31 of latch 30. This closing movement of levers 111, 112 is induced by the slant surface of the guides 115 and pin 113 sliding along the slant surface.

The activator 130 contacts one lever 112 of latching clamp 110 and is provided with a curved surface, in order to slide along an outer face of the lever 112. Activator 130 is, hence, only pivotally connected to locking device 100 and can rotate around this connection with locking device 100 simply by gravity. When the lever 112 reaches the locking state of the latching clamp 110, the activator 130 may reach a position above (next to) the lever 112, so that lever 112 is blocked. In other words, lever 112 and, hence, latching clamp 110, cannot be brought into the unlocking state, unless activator 130 clears a space which is required by lever 112 to achieve an open position.

As illustrated in cross-section A-A of FIG. 5, activator 130 may be provided with a handlebar 131, that can be reached from outside of locking device 100 and barrier 20, when barrier 20 is in the closed position. In order to release latch 30, activator 130 has to be manually brought into an open position, such as the one illustrated in FIG. 6. This triggers (or gives way for) a movement of latching clamp 110 induced by spring element 122 and delayed by damper 121, until latching clamp 110 reaches the unlocking state (FIG. 5) again. Then barrier 20 can be opened manually or automatically.

The visual indicator 140 is connected to activator 130 and functions in the same manner as described with respect to the first variant illustrated in FIGS. 2 to 4. When being connected to the activator 130 visual indicator 140 can immediately indicate that activator 130 has been moved from the blocking position (cf. FIG. 7) to the unblocking position (cf. FIG. 6) at the moment the opening movement of latching clamp 110 is triggered.

While the second variant of locking device 100 includes slightly more complex mechanics (e.g. two levers 111, 112 forming latching clamp 110), the closing of barrier 20 and locking latch 30 is easier, since it can be achieved by simply pushing latch 30 into the space provided by levers 111, 112 and thereby closing latching clamp 110 (i.e. bringing latching clamp 110 into the locking state). Moreover, the activator blocking latching clamp 110 simply by moving into the way of one lever 112 via gravity further simplifies the closing process.

Figure 8:
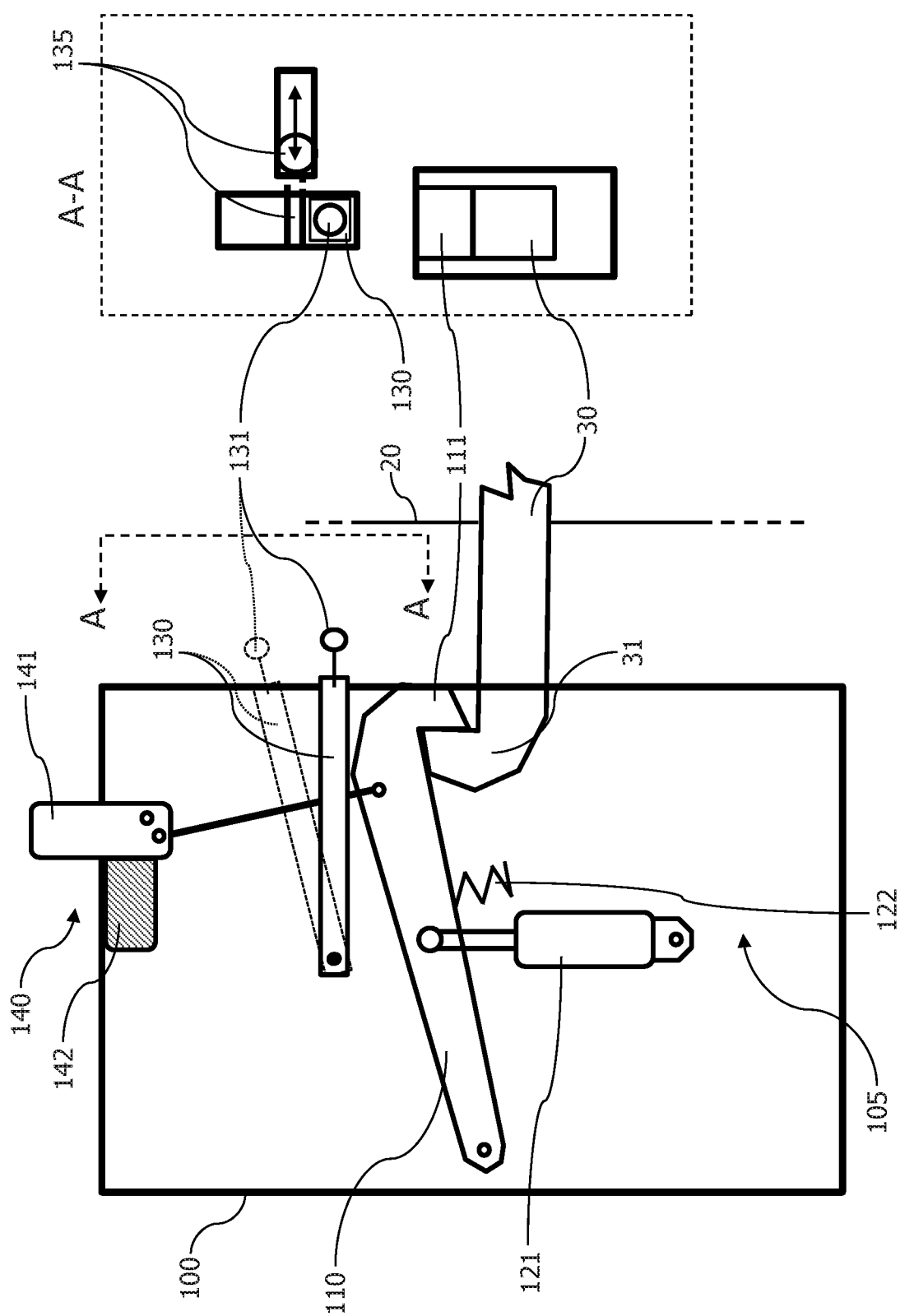
FIG. 8 schematically illustrates a further variant of a locking device.

FIG. 8 schematically illustrates a further variant of a locking device 100 in a locking state. The locking device 100 is very similar to the locking device illustrated in FIGS. 2 to 4. The activator 130 is implemented differently, so that only the features that are different from the locking device 100 of FIGS. 2 to 4 are described. The gap between barrier 20 and the locking device 100 in FIG. 8 is only for illustrative purposes. It is to be understood that barrier 20 can contact locking device 100, for example, at a right-hand side of locking device 100 in FIG. 8. FIG. 8 further illustrates a front view A-A onto a side face of locking device 100. In this front view cut-outs or openings in a housing of locking device 100 are illustrated with solid lines, which allow latch 30 (lock section 31) to reach into a locking device 100 and a portion of the activator 130 to stick out of the locking device 100.

The activator 130 is arranged above the latching clamp 110 and is pivotally hinged, so that it can rotate together with a movement of latching clamp 110. The activator 130 can move downwards in FIG. 8 due to gravity, or alternatively due to gravity and a spring-loaded element (not shown). Thus, when latching clamp 110 moves into the locking state, activator 130 may simply move (fall) onto latching clamp 110. In order to block the movement of latching clamp 110, activator 130 can be stopped from any movement away from latching clamp 110 by a stop element 135. In other words, stop element 135 blocks the movement of the latching clamp 110 induced by spring element 122 via the activator 130 arranged therebetween.

In order to open the barrier 20, stop element 135 can be moved sideways (see double arrow in front view A-A of FIG. 8), so that stop element 135 (e.g. a pin thereof) allows free movement of the activator 130. The latching clamp 110 is then able to be moved by spring element 122 and delayed by damper 121 to the unlocking state, wherein activator 130 simply lies on latching clamp 110 and is moved together with it. The activator 130 may achieve a position illustrated in FIG. 8 with dashed lines, so that activator 130 allows free movement of latching clamp 110.

It is to be understood that the locking device 100, according to FIG. 8, operates in the same manner as illustrated in FIGS. 3 and 4, with the exception of the activator 130 operating in the manner described in view of FIG. 8.

Figure 9:
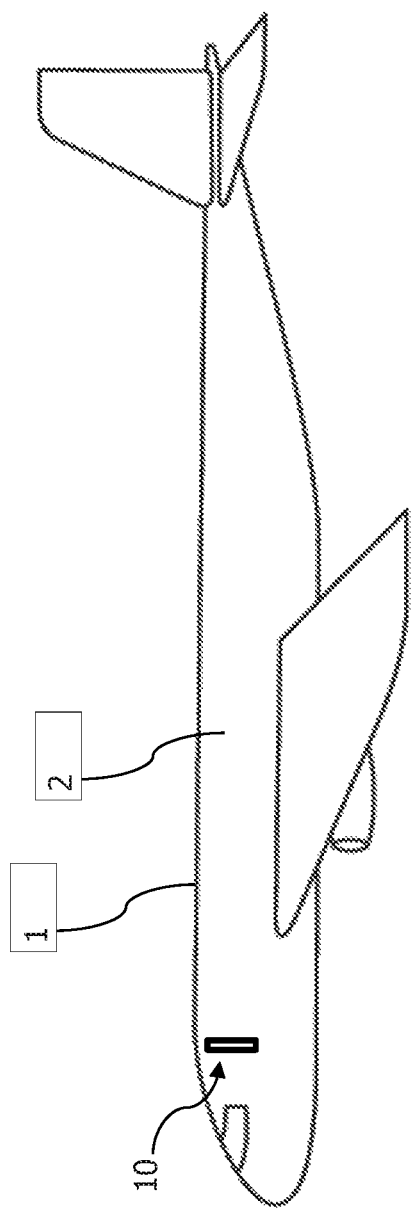
FIG. 9 schematically illustrates an aircraft.

FIG. 9 schematically illustrates an aircraft 1 comprising a passenger cabin 2 having an aircraft barrier system 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft barrier system for separating, within an aircraft, a secure area from a passenger cabin of the aircraft, wherein the aircraft barrier system comprises:
   a barrier installed inside the passenger cabin and configured to move between an open position and a closed position;
   a latch mounted to the barrier;
   a locking device comprising a latching clamp configured to lock the latch when the barrier is in the closed position; and,
   a release mechanism configured to move the latching clamp from a locking state, locking the latch, to an unlocking state, releasing the latch,
   wherein, in the unlocked state, the latching clamp and the latch are disengaged from one another, wherein the release mechanism is further configured to delay the moving of the latching clamp from the locking state to the unlocking state,
   wherein the release mechanism comprises a spring element acting on the latching clamp to move the latching clamp from the locking state to the unlocking state, and a damper connected to the latching clamp to slow the movement of the latching clamp,
   wherein the release mechanism comprises an activator that triggers the delayed moving of the latching clamp from the locking state to the unlocking state, wherein the activator is connected to the locking device at a connection point,
   wherein the connection point is located at a connection point end proximate to a first terminal edge of the activator opposite a handlebar end proximate to a second terminal edge of the activator, and
   wherein the activator is configured to rotate around the connection point.

2. The aircraft barrier system according to claim 1, wherein the activator includes a locking section disposed between the connection point end and the handlebar end which is configured to lock the latching clamp in the locking state,
   wherein the activator is configured to:
   move from a closed position to an open position, wherein the locking section in the closed position of the activator blocks the latching clamp from moving; or
   to be operated from a first side of the barrier facing the secure area and is configured to be operated from a second side of the barrier facing the passenger cabin; or,
   both.

3. The aircraft barrier system according to claim 2, further comprising:
   a visual indicator connected to the locking device and configured to visually indicate whether the latching clamp is in the locking state or the unlocking state, wherein the visual indicator is connected to the activator and moves together with the activator from the closed position to the open position of the activator.

4. The aircraft barrier system according to claim 2, wherein at least one of:

the handlebar end of the activator is either accessible through an opening in a housing of the locking device or extends beyond the housing of the locking device; and the locking section is either mechanically coupled to, or in contact with, the latching clamp when the latching clamp is in the locking state.

5. The aircraft barrier system according to claim 1, further comprising:
a visual indicator connected to the locking device and configured to visually indicate whether the latching clamp is in the locking state or the unlocking state.

6. The aircraft barrier system according to claim 5, wherein the visual indicator is connected to the latching clamp and moves together with the latching clamp from the locking state to the unlocking state of the latching clamp.

7. The aircraft barrier system according to claim 1, wherein the latching clamp has a hook shaped end and is configured to hook into a lock section of the latch.

8. The aircraft barrier system according to claim 7, wherein the lock section of the latch is a hook shaped end or a bar held by a fork-shaped latch.

9. The aircraft barrier system according to claim 1, wherein the latching clamp comprises two C-shaped levers pivotally connected to one another at a first end of each lever and configured to be moved relative to one another, so that a second end of the levers is spaced apart from one another when the latching clamp is in the unlocking state and the second end of the levers are contacting each other or are overlapping each other when the latching clamp is in the locking state.

10. The aircraft barrier system according to claim 9, wherein the latching clamp is configured to be moved by the latch when the barrier is moved from the open position to the closed position.

11. The aircraft barrier system according to claim 10, wherein the locking device comprises two guides each contacting one of the levers, and
wherein the levers are disposed with respect to the two guides, so that the second end of the levers are moving towards each other when the latching clamp is moved by the latch when the barrier is moved from the open position to the closed position.

12. The aircraft barrier system according to claim 1, wherein the barrier is slidable in a horizontal direction or a vertical direction to be moved between the open position and the closed position.

13. The aircraft barrier system according to claim 1, wherein the latch is configured to linearly translate when the latch is released from the releasing mechanism.

14. An aircraft area comprising:
a passenger cabin;
a door to be secured;
a secure area in front of the door; and
an aircraft barrier system, according to claim 1, separating the secure area from the passenger cabin.

15. The aircraft area according to claim 14, further comprising:
at least one monument, and
wherein a sidewall of the at least one monument borders the secure area, or
wherein the locking device is installed in or on a sidewall of the at least one monument, or
both.

16. The aircraft area according to claim 15, wherein the locking device is installed in or on a sidewall of the at least one monument.

17. The aircraft area according to claim 14, further comprising:
at least one monument, wherein the locking device is installed in or on a sidewall of the at least one monument.

18. An aircraft comprising an aircraft barrier system according to claim 1.

19. An aircraft comprising an aircraft area according to claim 14.

20. An aircraft barrier system for separating, within an aircraft, a secure area from a passenger cabin of the aircraft, wherein the aircraft barrier system comprises:
a barrier installed inside the passenger cabin and configured to move between an open position and a closed position;
a latch mounted to the barrier;
a locking device comprising a latching clamp configured to lock the latch when the barrier is in the closed position; and,
a release mechanism configured to move the latching clamp from a locking state, locking the latch, to an unlocking state, releasing the latch,
wherein, in the unlocked state, the latching clamp and the latch are disengaged from one another, wherein the release mechanism is further configured to delay the moving of the latching clamp from the locking state to the unlocking state,
wherein the release mechanism comprises a spring element acting on the latching clamp to move the latching clamp from the locking state to the unlocking state, and a damper connected to the latching clamp to slow the movement of the latching clamp,
wherein the release mechanism comprises an activator that triggers the delayed moving of the latching clamp from the locking state to the unlocking state, wherein the activator is connected to the locking device at a connection point,
wherein the connection point is located at a connection point end of the activator opposite a handlebar end of the activator,
wherein the activator is configured to rotate around the connection point, and
wherein the latch is configured to linearly translate when the latch is released from the releasing mechanism.

* * * * *